(12) United States Patent
Reynolds et al.

(10) Patent No.: US 7,567,548 B2
(45) Date of Patent: Jul. 28, 2009

(54) METHOD TO REDUCE THE DISTORTION IN A VOICE TRANSMISSION OVER DATA NETWORKS

(75) Inventors: Richard J B Reynolds, Ipswich (GB); Philip Gray, Ipswich (GB); Michael P Hollier, Ipswich (GB); Antony W Rix, Cambridge (GB)

(73) Assignee: British Telecommunications plc, London (GB)

( * ) Notice: Subject to any disclaimer, the term of this patent is extended or adjusted under 35 U.S.C. 154(b) by 960 days.

(21) Appl. No.: 10/297,495

(22) PCT Filed: Jun. 26, 2001

(86) PCT No.: PCT/GB01/02848

§ 371 (c)(1),
(2), (4) Date: Dec. 9, 2002

(87) PCT Pub. No.: WO02/01824

PCT Pub. Date: Jan. 3, 2002

(65) Prior Publication Data

US 2003/0133440 A1   Jul. 17, 2003

(30) Foreign Application Priority Data

Jun. 26, 2000   (EP) ................................. 00305377

(51) Int. Cl.
*H04L 12/66* (2006.01)
*H04M 11/00* (2006.01)
*H04B 15/00* (2006.01)

(52) U.S. Cl. ............... 370/352; 370/395.52; 379/93.26; 704/226; 381/94.2

(58) Field of Classification Search ................ 370/465, 370/401, 351, 352, 480, 345, 395.52; 455/570; 704/226; 381/94.2; 379/93.26
See application file for complete search history.

(56) References Cited

U.S. PATENT DOCUMENTS

| 4,438,511 | A | * | 3/1984 | Baran ......................... 370/204 |
| 4,757,517 | A | * | 7/1988 | Yatsuzuka ................... 375/245 |
| 4,833,714 | A | * | 5/1989 | Shimotani et al. ........... 704/253 |
| 5,548,642 | A | * | 8/1996 | Diethorn ................ 379/406.14 |
| 5,550,924 | A | * | 8/1996 | Helf et al. ................... 381/94.3 |
| 5,615,214 | A | * | 3/1997 | Chandos et al. ............. 370/349 |
| 5,838,786 | A | * | 11/1998 | Brown et al. ........... 379/406.04 |
| 5,949,891 | A | * | 9/1999 | Wagner et al. ................ 381/98 |
| 6,044,341 | A | * | 3/2000 | Takahashi .................... 704/226 |
| 6,070,137 | A | * | 5/2000 | Bloebaum et al. ........... 704/227 |
| 6,085,072 | A | * | 7/2000 | Komiya ....................... 455/83 |
| 6,130,916 | A | * | 10/2000 | Thomson .................... 375/285 |

(Continued)

FOREIGN PATENT DOCUMENTS

WO   WO 97/23078   *   6/1997

(Continued)

OTHER PUBLICATIONS

Ahuji et al., "Packet Telephony", Bell Labs Technical Journal, vol. 2, No. 2, Mar. 21, 1997, pp. 5-14.*

(Continued)

*Primary Examiner*—Alpus H Hsu
(74) *Attorney, Agent, or Firm*—Nixon & Vanderhye PC

(57) ABSTRACT

The perceptual quality of voice signals used for Voice over IP (VoIP) systems is assessed. The content of the voice data packets may be altered in order to increase the perceived quality of the VoIP system.

18 Claims, 2 Drawing Sheets

U.S. PATENT DOCUMENTS

Figure 1:
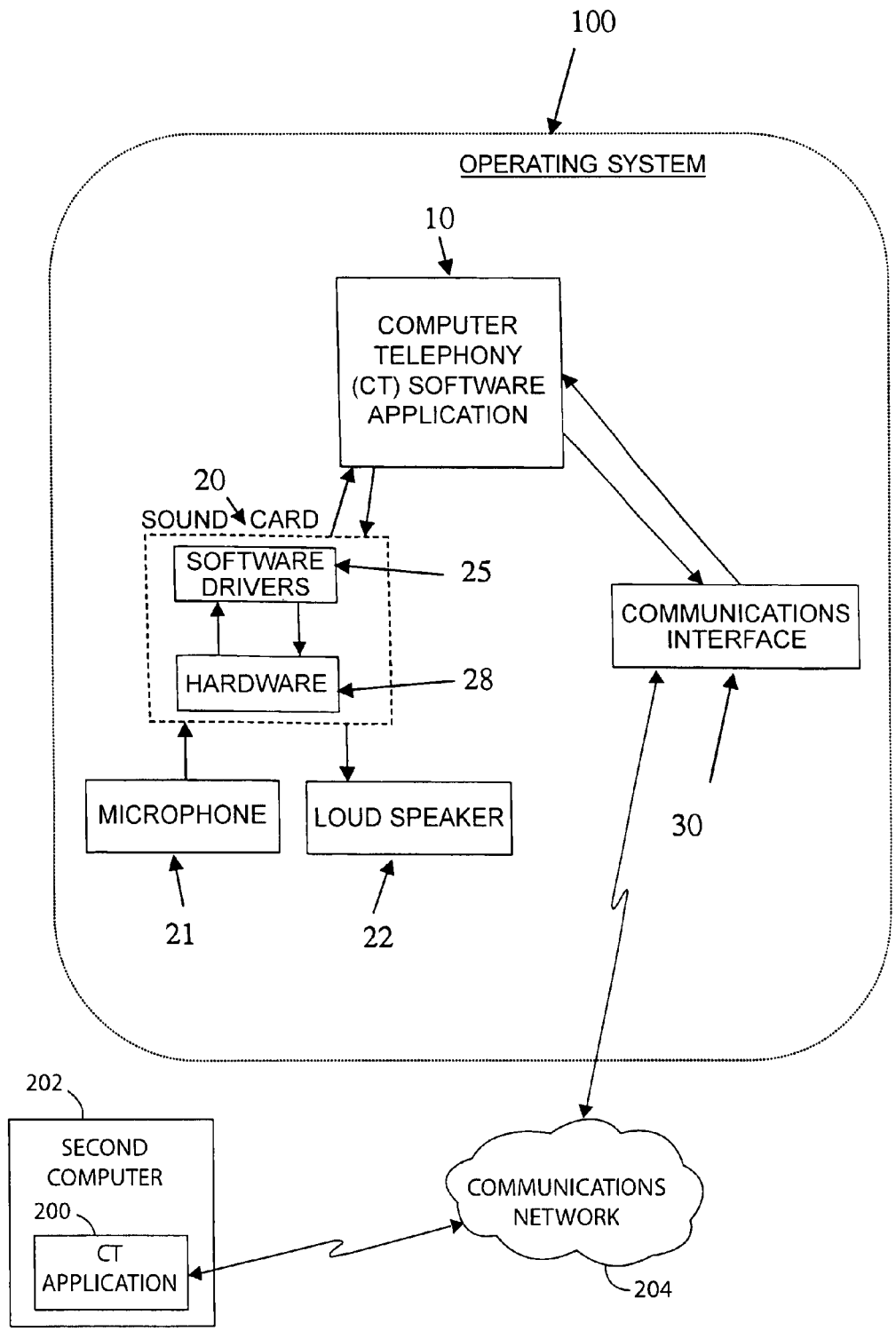

| | | | |
|---|---|---|---|
| 6,289,309 B1* | 9/2001 | deVries | 704/233 |
| 6,370,120 B1* | 4/2002 | Hardy | 370/252 |
| 6,424,939 B1* | 7/2002 | Herre et al. | 704/219 |
| 6,490,254 B1* | 12/2002 | Larsson et al. | 370/252 |
| 6,504,838 B1* | 1/2003 | Kwan | 370/352 |
| 6,868,080 B1* | 3/2005 | Umansky et al. | 370/354 |
| 6,882,711 B1* | 4/2005 | Nicol | 379/93.33 |
| 6,967,946 B1* | 11/2005 | Tackin et al. | 370/352 |
| 7,039,044 B1* | 5/2006 | Whitfield et al. | 370/356 |
| 7,117,152 B1* | 10/2006 | Mukherji et al. | 704/235 |
| 7,315,815 B1* | 1/2008 | Gersho et al. | 704/223 |
| 2002/0061012 A1* | 5/2002 | Thi et al. | 370/352 |

OTHER PUBLICATIONS

Catchpole, "Voice-Data Convergence and the Corporate Voice-over-IP Trial", IBTE Journal, vol. 17, Part 4, Jan. 19999, pp. 218-224.

\* cited by examiner

METHOD TO REDUCE THE DISTORTION IN A VOICE TRANSMISSION OVER DATA NETWORKS

This application is the U.S. national phase of international application PCT/GB01/02848 filed 26 Jun. 2001 which designated the U.S.

BACKGROUND

1. Technical Field

This invention relates to a signal processing method for use with computer based telephony.

2. Related Art

Convention telephony services are based upon the provision of a dedicated circuit to connect two telephony users via an exchange. The set-up and maintenance of the circuit have an associated cost, but the dedicated circuit allows a guaranteed quality of service (QoS) for the telephony service provided over the circuit. In contrast, computer communications made over packet based networks do not involve the set-up and maintenance of a circuit, but-instead a stream of packets are routed from one computer to a second computer. The route taken by-consecutive packets, may vary according to changes in network performance, congestion, etc. One of the disadvantages of packet-based networks when compared with circuit-based networks is that there is no guarantee that all of the packets transmitted by a computer will arrive at the destination computer or that those packets that are received by the destination computer will arrive in the same order that they were transmitted. Packets can be re-transmitted following a prompt by the destination computer and the application should be capable of re-ordering the received packets into the correct sequence and these steps are of little consequence if the data being transmitted between the computers does not have any time dependence, or example a file transfer, the transmission of an email message, etc. However, if the computers are transmitting real-time data, such as telephony or audio-visual signals for example, then the reception of out of sequence packets and the failure to receive some packets in time, or not at all, may cause significant problems with the playback of the real-time data.

Despite these disadvantages, it is perceived that in the near future most high capacity communications networks will be packet-based networks which will carry all forms of data, including real-time data such as speech and video. It is currently possible to use the public Internet to carry telephony services (often referred to as computer telephony (CT), PC telephony, Internet telephony or voice over IP (VoIP)) but the relatively low bandwidth available to Internet users means that such services tend to be of low quality. If such services are to be made commercially available over, for example, Intranets, Extranets, private data networks, etc., then it will be necessary to supply them with a Quality of Service (QoS) that is comparable with that of traditional, circuit-based telephony networks. In order for network and service providers to be able to achieve this objective they will need to have a means of measuring and controlling the QoS of CT services.

It is known from U.S. Pat. No. 5,949,891 to provide audio-conferencing equipment that comprises functionality that can partially compensate for the known characteristics of a particular microphone or headset of known characteristics. However, this requires pre-characterisation testing to determine the characteristics of the headset or microphone.

BRIEF SUMMARY

According to a first aspect, the invention provides a method of transmitting computer telephony packets over a communications network, the method comprising the steps of:
(a) generating a plurality of voice data packets;
(b) processing said plurality of voice-data packets to obtain a plurality of computer telephony packets;
(c) transmitting said plurality of computer telephony packets over said communications network; the method being characterised by the additional steps of:
  (i) analysing the frequency spectrum of a voice data packet generated during step (a);
  (ii) comparing the analysed frequency spectra against a frequency spectrum template and
  (iii) modifying one or more frequency components of the analysed frequency spectra to reduce the difference between said analysed frequency spectra and the frequency spectrum template
  prior to processing the plurality of voice data packets during step (b).

The advantage of this is that the characteristics of any headset or microphone can be compensated for on a dynamic basis, without any need to perform any pre-characterisation testing to determine what effects may be caused by the use of a particular piece of equipment. Step (iii) may comprise applying a band pass filter to the plurality of voice data packets and in particular this step may comprise filtering frequency components less than substantially 300 Hz from the plurality of voice data packets and/or filtering frequency components greater than substantially 3400 Hz from the plurality of voice data packets.

Step (iii) may comprise attenuating one or more frequency components from the plurality of voice data packets and/or amplifying one or more frequency components from the plurality of voice data packets.

Alternatively, step (iii) may comprise
  (I) assessing the quality of a voice signal by analysing speech fragments within the plurality of voice data packets that are perceptually relevant to a listener; and
  (II) identifying one or more frequency components from the plurality of voice data packets which generate perceptually significant distortions
  (III) adjusting said components to reduce the perceptually significant distortion within the plurality of voice data packets.

According to a second aspect of the invention there is provided a method of receiving computer telephony packets from a communications network, the method comprising the steps of;
(a) receiving a plurality of computer telephony packets from said communications network;
(b) extracting a plurality of voice data packets from said plurality of computer telephony packets;
(c) generating an analogue voice signal from said plurality of voice data packets; the method being characterised by the further steps of;

the method being characterised by the further steps of;
  (i) analysing the plurality of voice data packets for distortion;
  (ii) identifying one or more frequency components from the plurality of voice data packets which generate distortions; and (iii) adjusting said components to reduce the distortion within the plurality of voice data packets.

BRIEF DESCRIPTIONS OF THE DRAWINGS

Figure 2:
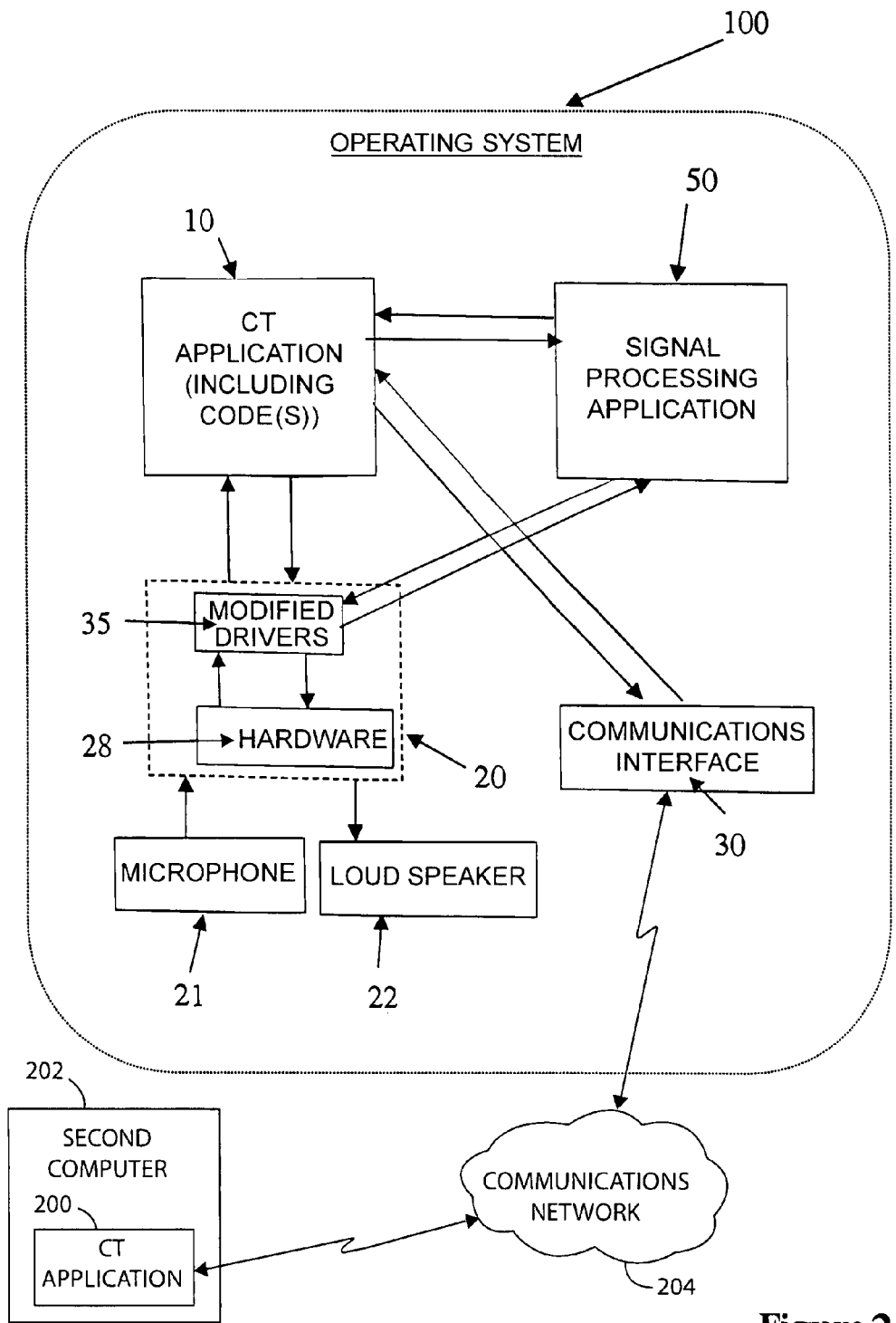

The invention will now be described, by way of example only, with reference to the following figures in which;

FIG. 1 shows a functional block diagram of a computer telephony terminal; and FIG. 2 shows a functional block diagram of a computer telephony terminal incorporating the present invention.

DETAILED DESCRIPTION OF THE EXEMPLARY EMBODIMENTS

FIG. 1 shows a functional block diagram of a computer telephony terminal. The computer telephony terminal is implemented as a computer. The computer includes a central processing unit, memory and storage devices and various hardware devices such as a display unit and a keyboard. The computer has an operating system (indicated by reference numeral 100 in FIG. 1) stored in the memory and storage devices. Software applications such as a word processor application and an Internet browser may also be stored in the memory and storage devices and run under the operating system. As will now be described with reference to FIG. 1, the computer includes a software application and hardware to provide it with the functionality of a computer telephony terminal. As shown in FIG. 1, the computer telephony terminal includes a computer telephony (CT) software application 10, which is a process that is run under the computer operating system 100. The CT application 10 is used to establish a communication link with a CT application 200 which is being run on a second computer 202, which is connected to the first computer via a communications network 204 (see FIG. 1). It is also possible for the CT application to communicate with a standard telephone which is connected to the PSTN (public switched telephony network) if there is a suitable gateway from the communications network to the PSTN. Additionally, the CT application may communicate with a so-called 'internet phone' which has the appearance and functionality of a conventional telephone but instead of connecting to, and communicating via, the PSTN such 'internet phones' are connected to the communication network and provide the same functionality as a computer running a CT application but at much reduced cost and complexity (see "*Voice-Data Convergence and the Corporate Voice-Over-IP Trial*", A Catchpole, IBTE Journal, Volume 17, part 4, January 1999, pages 218-224).

The CT application 10 communicates with a CT application in another computer, or internet phone, by sending and receiving data transmission packets, the data packets containing short segments of speech. The CT application 10 communicates with the computer's soundcard 20, which is connected to a microphone 21 and a loudspeaker(s) 22 (the microphone and loudspeaker(s) may be integrated and take the form of a headset or a conventional telephony handset). The user's voice signal is captured by the microphone 21 and then the soundcard converts the analogue signal supplied by the microphone into digital voice data. This digital voice data is then sent to the CT application, which may perform some form of data modulation or compression in order to increase the efficiency of the data transmission across the network before the digital voice data is arranged into packets of a suitable size (either in terms of the number of bytes of the package or in terms of the length of speech that is represented by the digital voice data). These voice data packets are sent to the communications interface 30 such that the voice data therein may be transmitted to the destination computer. The communications interface 30 may be a modem for dial-up access to a packet-based network or it may be a network card for direct access to a packet-based network. The communications interface places the voice data packets within the payload of the data transmission packets used by the communications interface, for example TCP (Transmission Control Protocol), UDP (User Datagram Protocol), etc. The data transmission packets are then routed across the communications network to the destination computer, where the analogue speech signal is recovered in a manner described below.

The communications interface 30 receives data transmission packets that have been sent to the computer and differentiates the data transmission packets by their content, for example part of a stream of computer telephony packets, a WWW download, an email message, etc. For CT data, the voice data packets are extracted from the payload of the data transmission packets and are then sent to the CT application 10. The CT application processes the voice data packets, ordering them in the correct sequence and demodulating (and/or decompressing) the data as necessary so that a stream of digital voice data can be sent to the soundcard 20, which converts the data from a digital signal to an analogue signal, which can then be played back to the user through the loudspeaker(s) 22.

The soundcard provides functionality using both hardware 28, which interfaces with the external hardware (loudspeakers, microphone, etc.) and the internal bus of the computer, and software drivers 25 stored in a memory device, which may be mounted on the soundcard, which allow the operating system and the applications running on the computer to access functions that cause the hardware to respond accordingly.

Personal computers typically are very versatile, enabling the user to add functionality to the PC by adding hardware and software, e.g. to enable DVD movie playback, receiving and playing back television and radio signals, reading CD-ROMs, etc. This wide variety of peripherals means that there is a very large number of different permutations of soundcard, loudspeakers, headphones and microphones that a user may have in a PC. As these devices can be set up in accordance with the user's preferences (either through selecting options within software programs or through physical placement of objects) it is clear that very few PCs will have identical audio properties. Due to the multi-functional nature of a personal computer, one audio set-up will be used for a number of different uses (e.g. stereo music playback, multi-dimensional sound effects from computer games, computer telephony, etc.). This is in distinct contrast to conventional telephone terminals, which have loudspeakers and handsets that are designed specifically for a single function, viz telephony. Because of this, the performance of the terminal equipment is optimised for the typical audio frequencies (i.e. the typical spectrum of the human voice) and signal levels (as the geometry of the handset defines a typical range of distances from the mouth to the handset microphone and a typical distance from the ear to the handset loudspeaker).

The inventors have realised that the multi-functional set-up of a personal computer severely compromises the ability of the computer to provide computer telephony functionality, as the codecs (coder/decoder) commonly used in CT applications, such as GSM, ADPCM, etc. are designed to work with signals having the frequency and level that are frequently experienced with conventional telephony terminals. In order to provide suitable CT functionality it is necessary to provide a processing step that transforms the audio signal into one that is more compatible with the codes used for CT.

FIG. 2 shows a schematic representation of a computer telephony terminal incorporating the present invention. The CT terminal shown in FIG. 2 is generally similar to the CT terminal of FIG. 1 but modified as described below.

Signal processing application 50 is a software process running under the computer operating system in parallel with the CT application 10 and any other software applications. The soundcard software drivers 25 shown in FIG. 1 have been replaced with modified soundcard drivers 35. These modified drivers have all the functionality required to operate under the operating system 100 (as do the soundcard drivers 25 shown in FIG. 1) plus additional functionality in order to interface with the signal processing application. The CT application additionally comprises one or more codecs for use when transforming the received voice signal into digital voice data. The codec(s) enable the digital voice data to be compressed to varying levels for example a PCM codec (as used in PSTNs) will give a 64 kbit/s output and a GSM codec gives a 9.6 kbit/s output. DPCM and ADPCM can be also be used to provide digital voice data streams, typically providing a signal having an equivalent quality to that of PCM but requiring less bandwidth (e.g. 32 kbit/s or 16 kbit/s).

In the operation of the present invention, analogue voice signals are received by the soundcard from the microphone. The soundcard transforms these analogue signals into the digital domain and sends the digital voice data to the signal processing application 50. The signal processing application analyses the received digital voice data in order to transform the digital voice data so that it can be presented to the codec in the CT application in a more suitable format.

Each of the codecs are optimised to code signals that normally have frequency components from the extremes of human speech removed or attenuated, for example the components below 300 Hz and above 3.4 kHz will normally be filtered. The inventors have observed that sending signals with significant low frequency components to codecs has led to a very muffled sound when the output of the codec is decoded. It has been postulated that the energy of the low frequency sound components overwhelms the codec, preventing it from coding the input signals correctly. As the lower frequencies in this case appear to cause the most significant problems, it may only be necessary to filter out the lower frequencies, although there may be some systems for which only filtering out the higher frequency components is applicable. Additionally, the amplitude of the digital voice data may be processed before the data is presented to the CT application, in order to bring it within an expected maximum threshold value. If an analysis of the digital voice data indicates that the audio signals contained a skew, towards either the lower or the higher frequency end of the signal spectrum, or if a frequency band is more pronounced than would be expected, then the digital voice data can be manipulated to remove the skew to the spectrum or to 'flatten out' any unexpected features.

For each codec a frequency template can be generated which defines the upper and lower frequency limits, roll-on and roll-off gradients, maximum amplitude values, etc. The exact frequency cut-off point and the amount of filtering applied for the filters can be varied to suit the details of a particular coded and/or transmission system. Such templates can be generated by feeding speech patterns and signals through a codec and assessing the quality of the codec output to determine which frequency components, and at which amplitudes, cause distortion and coding errors.

The signal processing application compares the frequency spectrum of the received digital voice data with the frequency template associated with the codec in use and changes the voice data frequency spectrum to be as similar as possible to the frequency template. If the signal processing application is not able to call upon sufficient machine resources to compare every frequency component and then make all the necessary changes in real time (i.e. without introducing an excessive delay into the system) then the most significant frequency components should be prioritised and the comparison (and any necessary) changes should be made for the priority frequency components. Once the digital voice data has been processed in this manner then it is passed to the CT application for further processing prior to CT packets being transmitted.

The analysis of the voice data may be performed on a one-time basis when a VoIP call is set up, but it is preferred that such analysis is performed on a frequent basis or continually in order to accommodate any changes in the user setup (i.e. the user moving further from a fixed microphone, changes in background noise, etc.).

Rather than performing a simple frequency filtering or attenuation of signal levels, it is possible to perform a perceptual analysis of the signal, as is disclosed by EP-B-0 647 375, EP-B-0 705 501, EP-B-0 776 566 & EP-B-0 776 567. These techniques can be used to assess the quality of a voice signal by analysing speech fragments that are perceptually relevant to a listener.

The result of this is that the digital voice data can be presented to the CT application in a more suitable form for being coded. Codecs in use in PSTNs have been designed to receive signals that have been constrained in the frequency domain (i.e. low and high frequency components are filtered out from the audio signals) and telephone handsets have been designed in the light of research into human behaviour, resulting in audio signal levels that tend to fall within known thresholds.

The signal processing application 50 may also be used to 'clean up' incoming signals so that a better quality of audio signal is presented to the user (i.e. filtering out noise where possible). The processing application may measure the audio signal played back to the user via the microphone used in the CT application. This information may be used to attenuate or boost certain frequency components of the signal that is played back to the user, compensating for the environment in which the user is in or the quality of the users playback equipment.

Although it is preferred to implement the present invention for a computer using the Windows 95 operating system, it will be readily understood that the invention is equally applicable for use with other operating systems such as other Windows variants (Windows NT, Windows 98, Windows 2000, etc.), MacOS, BeOS, Linux and Unix variants, etc.

In particular, computer telephony packets are transmitted over a communications network 204 by:

(a) generating (at sound card 20) a plurality of voice data packets;

(b) processing the plurality of voice-data packets (at 50 and 10) to obtain a plurality of computer telephony packets;

(c) transmitting the plurality of computer telephony packets over the communications network 204;

(d) analyzing the frequency spectrum (at 50) of a voice data packet generated during step (a);

(e) comparing (at 50) the analyzed frequency spectra against a frequency spectrum template; and (f) modifying one or more frequency components of the analyzed frequency spectra to reduce the difference between the analyzed frequency spectra and the frequency spectrum template prior to processing the plurality of voice data packets during step (b).

This method of transmitting computer telephony packets over a communications network may include applying a band pass filter to the plurality of voice data packets in step (f). This step may also include filtering frequency components less than substantially 300 Hz from the plurality of voice data packets and/or filtering frequency components greater than substantially 3400 Hz from the plurality of voice data packets.

Step (c) of this method may include attenuating one or more frequency components from the plurality of voice data packets and/or amplifying one or more frequency components from the plurality of voice data packets.

Step (f) of this method may include:

(i) assessing the quality of a voice signal by analyzing speech fragments within the plurality of voice data packets that are perceptually relevant to a listener;

(ii) identifying one or more frequency components from the plurality of voice data packets which generate perceptually significant distortions; and (iii) adjusting said components to reduce the perceptually significant distortion within the plurality of voice data packets.

The exemplary embodiment provides:

(a) receiving (at 30) a plurality of computer telephony packets from a communications network;

(b) extracting (at 10) a plurality of voice data packets from the plurality of computer telephony packets;

(c) analyzing (at 50) the plurality of voice data packets for distortion; and (d) generating (at 10, 20) voice signals from the plurality of voice data packets.

It should be understood that although the above discussion has focused upon the addition of test functionality into a computer running a computer telephony application, the same test functionality can be incorporated into a set top box, games console, personal digital assistant (PDA) that provide computer telephony functionality or mobile terminals and handsets that tend to be used in noisy environments or use low-bandwidth and/or low quality communications links. In such a case the invention may be implemented using solely software, solely hardware or a combination of software and hardware.

The invention claimed is:

1. A method of transmitting computer telephony packets over a communications network, the method comprising:
   (a) generating a plurality of voice data packets;
   (b) analyzing the frequency spectrum of voice data packets generated during step (a);
   (c) comparing the analyzed frequency spectra against a frequency spectrum template;
   (d) modifying one or more frequency components of the analyzed frequency spectra to reduce the difference between said analyzed frequency spectra and the frequency spectrum template;
   (e) processing said plurality of voice data packets to obtain a plurality of computer telephony packets; and
   (f) transmitting said plurality of computer telephony packets over said communications network.

2. A method of transmitting computer telephony packets over a communications network according to claim 1, wherein step (d) comprises applying a band pass filter to the plurality of voice data packets.

3. A method of transmitting computer telephony packets over a communications network according to claim 1, wherein step (d) comprises said filtering frequency components less than substantially 300 Hz from the plurality of voice data packets.

4. A method of transmitting computer telephony packets over a communications network according to claim 1, wherein step (d) comprises filtering said frequency components greater than substantially 3400 Hz from the plurality of voice data packets.

5. A method of transmitting computer telephony packets over a communications network according to claim 1, wherein step (f) comprises attenuating one or more said frequency components from the plurality of voice data packets.

6. A method of transmitting computer telephony packets over a communications network according to claim 1, wherein step (f) comprises amplifying one or more said frequency components from the plurality of voice data packets.

7. A method of transmitting computer telephony packets over a communications network according to claim 1, wherein step (d) comprises:
   (I) assessing quality of a voice signal by analyzing speech fragments within the plurality of said voice data packets that are perceptually relevant to a listener; and
   (II) identifying one or more frequency components from the plurality of said voice data packets which generate perceptually significant distortions; and
   (III) adjusting said components to reduce the perceptually significant distortion within the plurality of voice data packets.

8. A computer readable program storage medium encoded with a computer program which, when executed by a computer, causes the computer to perform all the steps of claim 1.

9. A method of receiving computer telephony packets from a communications network, the method comprising:
   (a) receiving a plurality of said computer telephony packets from said communications network;
   (b) extracting a plurality of voice data packets from said plurality of computer telephony packets;
   (c) analyzing the plurality of voice data packets for distortion including identifying one or more frequency components from the plurality of said voice data packets which generate said distortion;
   (d) modifying the plurality of voice data packets as a function of frequency to reduce said distortion within the plurality of voice data packets; and
   (e) generating an analogue voice signal from said plurality of modified voice data packets.

10. A computer readable program storage medium encoded with a computer program which, when executed by a computer, causes the computer to perform all the steps of claim 9.

11. Apparatus for transmitting computer telephony packets over a communications network, said apparatus comprising:
   means for generating a plurality of voice data packets;
   means for analyzing the frequency spectrum of said generated voice data packets;
   means for comparing the analyzed frequency spectra against a frequency spectrum template;
   means for modifying one or more frequency components of the analyzed frequency spectra to reduce the difference between said analyzed frequency spectra and the frequency spectrum template;
   means for processing said plurality of voice data packets to obtain a plurality of computer telephony packets; and
   means for transmitting said plurality of computer telephony packets over said communications network.

12. Apparatus as in claim 11, wherein said means for modifying a band pass filter is configured to filter the plurality of voice data packets.

13. Apparatus in claim 11, wherein said means for modifying comprises means for filtering said frequency components less than substantially 300 Hz from the plurality of voice data packets.

14. Apparatus as in claim 11, wherein said means for modifying comprises means for filtering said frequency components greater than substantially 3400 Hz from the plurality of voice data packets.

15. Apparatus as in claim 11, wherein said means for transmitting comprises means for attenuating one or more said frequency components from the plurality of voice data packets.

16. Apparatus as in claim 11, wherein said means for transmitting comprises means for amplifying one or more said frequency components from the plurality of voice data packets.

17. Apparatus as in claim 11, wherein said means for comparing comprises:
   (I) means for assessing quality of a voice signal by analyzing speech fragments within the plurality of said voice data packets that are perceptually relevant to a listener;
   (II) means for identifying one or more frequency components from the plurality of voice data packets which generate perceptually significant distortions; and
   (III) means for adjusting said components to reduce the perceptually significant distortion within the plurality of voice data packets.

18. Apparatus for receiving computer telephony packets from a communications network, said apparatus comprising:
   (a) means for receiving a plurality of said computer telephony packets from said communications network;
   (b) means for extracting a plurality of voice data packets from said plurality of computer telephony packets;
   (c) means for analyzing the plurality of voice data packets for distortion including identifying one or more frequency components from the plurality of said voice data packets which generate said distortion;
   (d) modifying the plurality of voice data packets as a function of frequency to reduce said distortion within the plurality of voice data packets; and
   (e) means for generating an analogue voice signal from said plurality of modified voice data packets.

* * * * *